(12) United States Patent
Mackin et al.

(10) Patent No.: US 10,173,780 B2
(45) Date of Patent: Jan. 8, 2019

(54) AIRCRAFT LIQUID HEAT EXCHANGER ANTI-ICING SYSTEM

(71) Applicant: The Boeing Company, Chicago, IL (US)

(72) Inventors: Steve G. Mackin, Bellevue, WA (US); Christopher R. Burgan, Bothell, WA (US)

(73) Assignee: The Boeing Company, Chicago, IL (US)

(*) Notice: Subject to any disclaimer, the term of this patent is extended or adjusted under 35 U.S.C. 154(b) by 308 days.

(21) Appl. No.: 15/006,872

(22) Filed: Jan. 26, 2016

(65) Prior Publication Data

US 2017/0210477 A1    Jul. 27, 2017

(51) Int. Cl.
*B64D 15/02*    (2006.01)
*B64D 15/08*    (2006.01)
*B64C 1/12*    (2006.01)

(52) U.S. Cl.
CPC ............... *B64D 15/08* (2013.01); *B64C 1/12* (2013.01)

(58) Field of Classification Search
CPC ........ B64D 15/00; B64D 15/02; B64D 15/06; B64D 2033/0233; B64D 33/08; F01D 25/02; F02C 7/047
See application file for complete search history.

(56) References Cited

U.S. PATENT DOCUMENTS

| | | | | |
|---|---|---|---|---|
| 2,110,731 A | * | 3/1938 | Horrocks ............... | B64D 15/06 244/134 B |
| 2,160,397 A | * | 5/1939 | Brammer ............... | B64D 15/06 244/134 B |
| 2,366,089 A | * | 12/1944 | Leon ..................... | B64D 15/02 165/296 |

(Continued)

FOREIGN PATENT DOCUMENTS

| | | | | |
|---|---|---|---|---|
| CA | 2950782 A1 | * | 6/2017 | ............. B64D 15/06 |
| EP | 3018304 A1 | * | 5/2016 | ............... F02C 7/16 |
| GB | 2512442 A | * | 10/2014 | ............. F02C 7/047 |

OTHER PUBLICATIONS

"GE9X OGV Heat Exchanger Status/Plan", Hacin Sennoun, Nov. 7, 2013.
"De-Ice and Anti-Ice Systems"—Phil Plumley.

*Primary Examiner* — Richard R. Green
*Assistant Examiner* — Michael A. Fabula
(74) *Attorney, Agent, or Firm* — Miller, Matthias & Hull LLP

(57) ABSTRACT

A combination of liquid-to-air and air-to-liquid heat exchangers is employed in an aircraft anti-icing system configured to avoid ice buildup on exterior leading edges of wings and engine inlets of aircraft during flight under known or anticipated icing conditions. The anti-icing system may be utilized in lieu of traditionally employed air-to-air heat exchangers. In one embodiment, a heated anti-icing liquid is conveyed through tubes juxtaposed against interior surfaces of the leading edges of the wings and engine inlets. The (Continued)

liquid is heated by engine core bleed air, and the tubes are arranged to optimize heat flux directly from the tubes into the leading edges of the wings and the engine inlets, respectively, to avoid ice accumulation. In one configuration, spring clips retain the tubes directly against the leading edge interiors of the wings and engine inlets, and thermal grease and insulation are used to enhance heat flux.

14 Claims, 4 Drawing Sheets

(56) References Cited

U.S. PATENT DOCUMENTS

| | | | | |
|---|---|---|---|---|
| 2,582,842 | A * | 1/1952 | Messinger | B64D 13/08 237/12.3 B |
| 2,645,435 | A * | 7/1953 | Pouit | B64C 27/18 244/123.12 |
| 3,094,301 | A * | 6/1963 | Taylor | B64D 15/02 244/134 R |
| 5,484,122 | A * | 1/1996 | DeSalve | B64D 13/00 244/117 A |
| 6,415,595 | B1 * | 7/2002 | Wilmot, Jr. | B64D 13/006 60/266 |
| 6,698,687 | B2 * | 3/2004 | Daggett | B64C 21/00 244/57 |
| 6,990,797 | B2 * | 1/2006 | Venkataramani | F02C 7/047 244/134 R |
| 8,444,093 | B1 * | 5/2013 | Epstein | B64D 15/02 244/134 B |
| 9,429,072 | B2 * | 8/2016 | Diaz | F02C 7/047 |
| 2003/0150955 | A1 * | 8/2003 | Daggett | B64C 21/00 244/57 |
| 2005/0023412 | A1 * | 2/2005 | Baptist | B64D 15/06 244/10 |
| 2007/0234704 | A1 * | 10/2007 | Moniz | F01D 25/02 60/39.093 |
| 2007/0267536 | A1 * | 11/2007 | Hill | F02C 7/047 244/1 R |
| 2011/0031353 | A1 * | 2/2011 | Stolte | B64C 21/04 244/207 |
| 2012/0160445 | A1 * | 6/2012 | Baumgardt | B64C 1/26 165/41 |
| 2013/0140004 | A1 * | 6/2013 | Behrens | B64D 13/00 165/104.14 |
| 2013/0333857 | A1 * | 12/2013 | Guering | B64D 13/00 165/41 |
| 2014/0190162 | A1 * | 7/2014 | Fonseca | F01D 15/005 60/605.1 |
| 2014/0345292 | A1 * | 11/2014 | Diaz | F02C 7/047 60/779 |
| 2016/0131036 | A1 * | 5/2016 | Bintz | F02C 7/16 60/779 |
| 2016/0332724 | A1 * | 11/2016 | Mehring | F28F 13/003 |
| 2017/0030266 | A1 * | 2/2017 | Cerny | F02C 7/14 |
| 2017/0036775 | A1 * | 2/2017 | Jones | F01P 7/16 |
| 2017/0167382 | A1 * | 6/2017 | Miller | B64D 15/06 |

* cited by examiner

AIRCRAFT LIQUID HEAT EXCHANGER ANTI-ICING SYSTEM

FIELD

The present disclosure relates generally to aircraft anti-icing systems, and more specifically to use of liquid-to-air and air-to-liquid heat exchangers for enhancing heat transfer efficiencies over conventional air-to-air heat exchangers.

BACKGROUND

Modern aircraft engines have become increasingly more efficient. Higher engine efficiencies have given rise to a need for increased heat exchanger sizes in air-to-air anti-icing systems traditionally employed on conventional jet aircraft. The larger heat exchangers have become necessary to provide enough engine core bleed air for sufficient anti-icing capability. However, continued increases of heat exchanger size can impact engine performance and engine nacelle integration.

Although liquid heat transfer mechanisms have long been recognized as more efficient than air-to-air heat transfer mechanisms, liquid systems have in the past been considered too heavy for use in aircraft, which are typically limited by operational weight constraints. However, engine energy extraction issues may require liquid systems to harvest waste heat energy from the engine. As such, the use of liquid heat exchanger anti-icing systems may now be viable for increased efficiency in commercial aircraft.

During flight, traditional air-to-air systems have required movements of large volumes of airflow through typical wing D-ducts, situated immediately behind wing leading edges, to assure up to 450 degree Fahrenheit heated air temperatures required to assure requisite BTU per hour per linear foot heat transfer for satisfactory anti-icing of wing leading edges, in accordance with icing conditions described in Appendix C of the Federal Aviation Regulations. Use of liquid heat exchangers directed to optimizing anti-icing heat transfer efficiencies should allow for use of physically smaller heat exchangers, in part compensating for any additional weight burden of liquids used. As such, liquid heat exchanger systems may potentially become more common in future large commercial aircraft.

SUMMARY

In accordance with one aspect of the present disclosure, an aircraft anti-icing system includes a liquid-to-air heat exchanger. The system uses exterior and interior wing leading edge surfaces for thermal transfers; thus a first heat exchanger physically incorporates the exterior and internal surfaces of the wing's leading edge, as well as a plurality of heated liquid-conveying tubes secured directly to the internal surface of the leading edge.

In accordance with another aspect of the aircraft anti-icing system of the present disclosure, each of the plurality of heated tubes conveys a polypropylene glycol liquid solution in water of at least 40% polypropylene glycol. The liquid solution is heated by engine core bleed air. In addition, the plurality of tubes is arranged in parallel along the interior surface of the leading edge, and each tube is secured to both an anti-icing liquid supply manifold and a corresponding return manifold.

In accordance with another aspect of the aircraft anti-icing system of the present disclosure, the tubes may be formed of stainless steel, and each tube has a flat side directly secured against the interior surface of the leading edge to optimize heat transfer.

In accordance with another aspect of the aircraft anti-icing system of the present disclosure, a spring clip is configured to retain the flat sides of the tubes against the interior surface of the leading edge, and a thermal grease is interposed between the tubes and the interior surface of the leading edge for enhancing heat transfer.

In accordance with another aspect of the aircraft anti-icing system of the present disclosure, a layer of insulation is applied against the tubes, and the tubes are retained within a space between the thermal grease and the insulation. In addition, physical spacing between the pluralities of heated liquid-conveying tubes may vary about the arc of the leading edge of the wing.

In accordance with yet another aspect of the aircraft anti-icing system of the present disclosure, an engine inlet incorporates a leading edge that defines exterior and interior surfaces for providing another heat transfer aspect, either separately or in concert with the heat transfer aspect provided for the wings.

The features, functions, and advantages disclosed herein can be achieved independently in various embodiments or may be combined in yet other embodiments, the details of which may be better appreciated with reference to the following description and drawings.

It should be understood that the drawings are not necessarily to scale, and that the disclosed embodiments are illustrated only schematically. It should be further understood that the following detailed description is merely exemplary and not intended to be limiting in its application or uses. As such, although the present disclosure is for purposes of explanatory convenience only depicted and described in illustrative embodiments, the disclosure may be implemented in numerous other embodiments, and within various systems and environments not shown or described herein.

DETAILED DESCRIPTION

The following detailed description is intended to provide both apparatus and methods for carrying out the disclosure. Actual scope of the disclosure is as defined by the appended claims.

Figure 1:
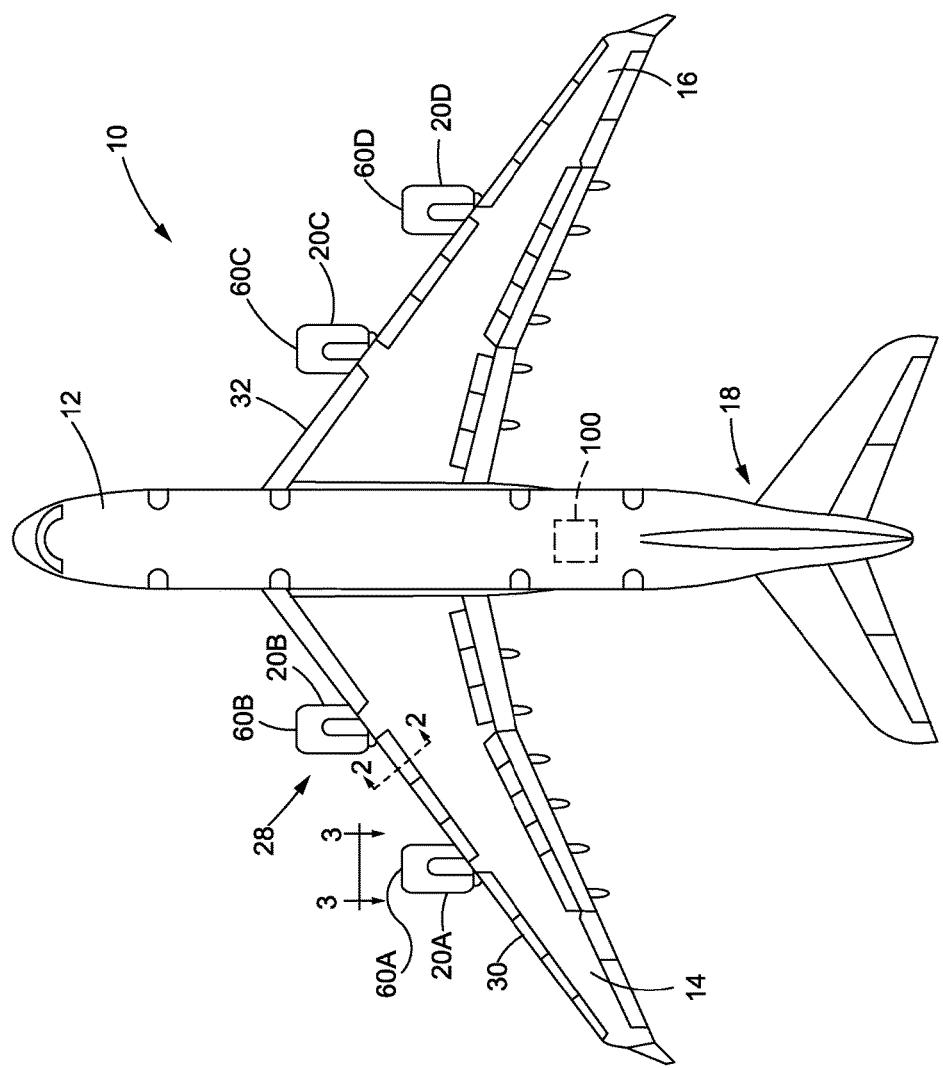
FIG. 1 is a plan view of a commercial aircraft which incorporates an anti-icing system constructed in accordance with the present disclosure.

In FIG. 1, a commercial passenger jet aircraft 10 is displayed. The aircraft 10 includes a fuselage 12 and left and right wings 14, 16, respectively, fixed to the fuselage 12. An empennage 18 defines the rear or tail portion of the fuselage 12, while left engines 20A, 20B and right engines 20C and 20D are secured to respective left and right wings 14, 16. The aircraft includes in anti-icing system 28 which includes both wing and engine heat exchanger components as will be described herein. To the extent that the anti-icing system 28 is intended to keep the leading edges 30, 32 of the left and right wings 14, 16, respectively, free of ice accumulation during actual flight rather than ground operations, the anti-icing system 28 includes a first heat exchanger formed, in part, of the leading edges 30, 32, as now described.

Figure 2:
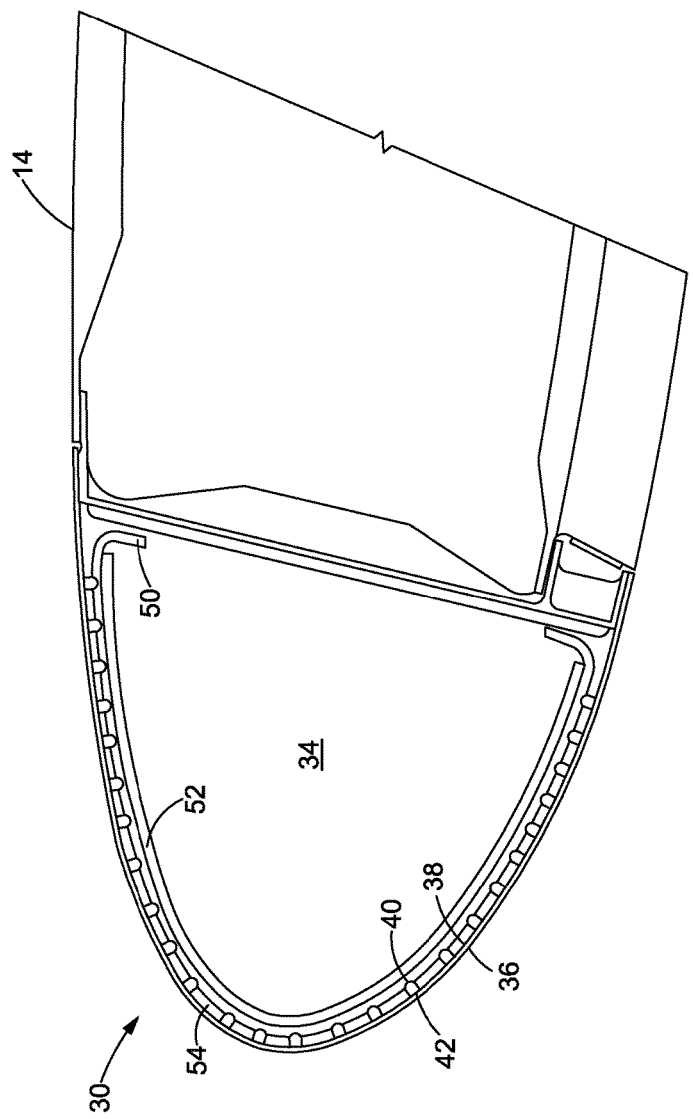
FIG. 2 is a cross-sectional view of the leading edge of a wing of the aircraft of FIG. 1, taken along lines 2-2 of FIG. 1, which depicts anti-icing liquid-conveying tubes juxtaposed directly against the interior surface of the leading edge, in accordance with the present disclosure.

Referring now to FIG. 2, the leading edge 30 of the left-wing 14 is shown in cross-section. As those skilled in the art will appreciate, the leading edge 30 inherently forms a so-called D-duct situated immediately behind the leading edge. The leading edge 30, also variously called a lip skin, is formed of an outer aluminum alloy skin layer 36, which provides an exterior surface openly exposed to atmospheric flight conditions. Within the D-duct 34, an interior surface 38 of the leading edge 30, shielded from and thus unexposed to atmospheric flight conditions, is lined with a series of parallel tubes 40 (shown only in cross-section) configured to convey a heated anti-icing liquid solution. In the disclosed arrangement, the tubes 40 extend between anti-icing liquid manifold supply and return headers 46, 48 (FIG. 4), and are formed of stainless steel, although other suitable heat conductive materials may be employed. Correspondingly, similar tubes 70 include anti-icing liquid manifold supply and return headers 76, 78, (FIG. 3) that will be described below.

In traditional anti-icing systems involving air-to-air heat exchangers, the D-duct 34 offers a relatively voluminous cavity for ducting of hot core engine bleed air to heat the interior surface 38 of the leading edge 30 to avoid icing under inclement flying conditions. The disclosed anti-icing system 28 instead employs a heated liquid, such as a polypropylene glycol liquid solution in water, that in one example may be at least 40% polypropylene glycol, to flow within relatively small tubes 40 for providing anti-icing capability of the aircraft 10 during flight. In the disclosed embodiment, each tube 40 includes a substantially flat contacting surface 42 that is juxtaposed directly against the interior surface 38 for optimizing heat transfer. Each tube may have a dimension of 30 to 40 thousandths in diameter to have sufficient durability for handling requisite pressures of an anti-icing system. The tubes 40 are configured such that their flat contacting surfaces 42 are complementary to the interior surface 38 of the leading edge 30. As such, the surface area of each of the tubes 40 in contact with the interior surface 38 of the leading edge 30 may be maximized to improve heat flux to the exterior surface 36 of the leading edge 30. To the extent that the described heat transfer is from the anti-icing liquid (conveyed through the tubes 40) and outwardly toward exterior surfaces 36, and since the latter surfaces 36 are exposed to air, the anti-icing system 28 may be referred to as a "liquid-to-air" heat exchanger formed, in part, of the leading edges 30, 32 of each wing 14, 16.

A spring clip 50 is configured to press against the tubes 40, and to hence retain the tubes firmly in place against the interior surface 38. In addition, an insulation layer 52 is applied against the spring clip 50 to prevent heat from flowing into the D-duct 34, which would otherwise negatively impact heat transfer efficiency. Finally, a heat conductive thermal grease 54 may be applied between the interior surface 38 of the leading edge 30, the tubes, and the spring clip, for further enhancing efficiency of heat transfer.

Figure 3:
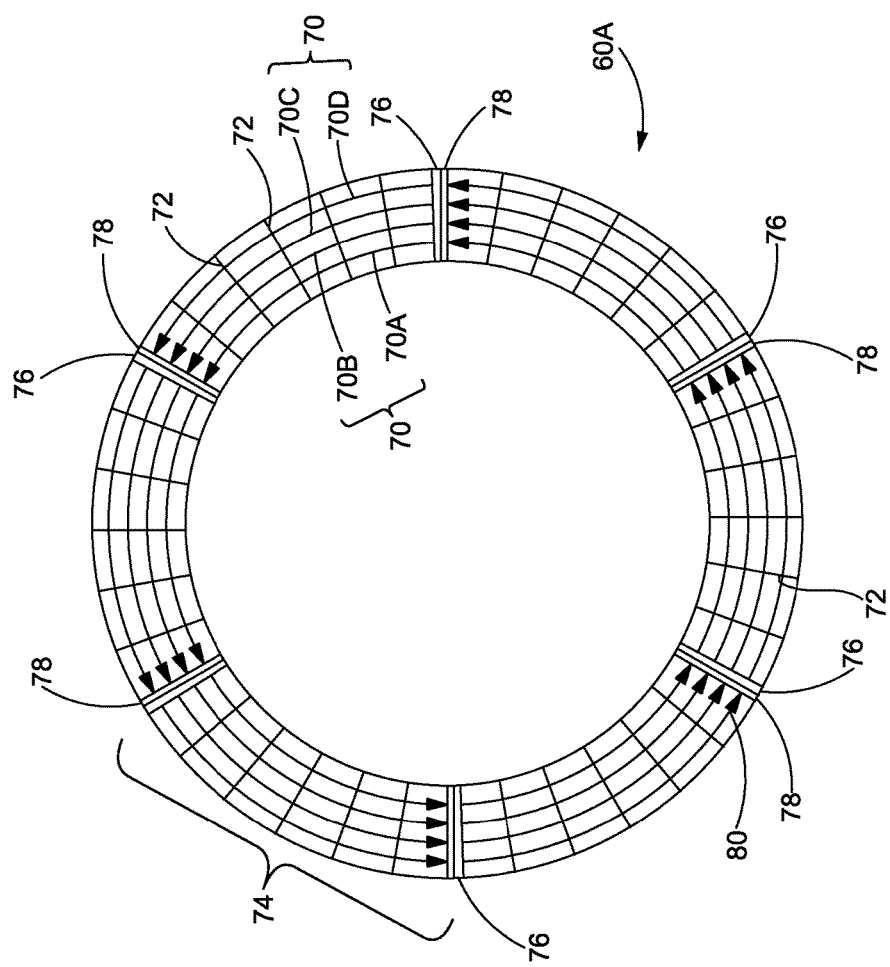
FIG. 3 is a schematic frontal view of an engine inlet, taken along lines 3-3 of FIG. 1, which also includes liquid-conveying tubes constructed in accordance with the present disclosure.

Referring now to FIG. 3, each engine 20a-d (FIG. 1) includes a ring-shaped engine inlet 60A-D, respectively, through which ambient air passes to support the combustion in the engines 20 during flight. As the engines 20 of the aircraft 10 are subjected to the same atmospheric conditions as the wings 14, 16, i.e., under which ice buildups may occur during freezing conditions associated with super-cooled moisture laden air, each engine inlet 60 (only one shown schematically as 60A) is also provided with heated liquid-conveying tubes 70, each of which is formed as shown with a curvature or arc to fit within the engine inlet 60. The tubes 70, as were the described tubes 40, are arranged in parallel and are retained by spring clips 72, analogous to the described spring clips 50, to be retained in place against an interior surface (not shown) of the engine inlet 60. As such, those skilled in the art will appreciate that the disclosed anti-icing system 28 includes a second liquid-to-air heat exchanger formed, in part, of each engine inlet 60A-D.

In the view of FIG. 3, it will be apparent that several sections 74 of the tubes 70 may extend between heated anti-icing supply manifold headers 76 and cooled anti-icing return manifold headers 78. Arrows 80 indicate directional flows of the anti-ice liquid within each section 74. It should further be noted that the physical spacing between the pluralities of the parallel tubes may be variable. For example, the tubes may be spaced relatively close together at the apex (or forward-most point) of the leading edge of the wing or the engine inlet, and increasingly spaced apart as their distances from the apex increase.

Utilization of the described wing and engine inlet anti-icing features may be separately or in combination. For example, as an aircraft is taxied on the ground, issues of ice buildup on leading edges 30, 32 of the wings 14, 16 are generally minimal. At the same time, however, the engine inlets 60 may be separately subjected to ice buildup because engine-induced super-cooled moisture may be drawn over the engine inlets 60 during any ground operations in advance of takeoff and flight. Thus, during taxi only the engine anti-icing feature may be utilized, while during flight both engine and wing anti-icing features may be utilized either in combination or separately, as demanded.

Figure 4:
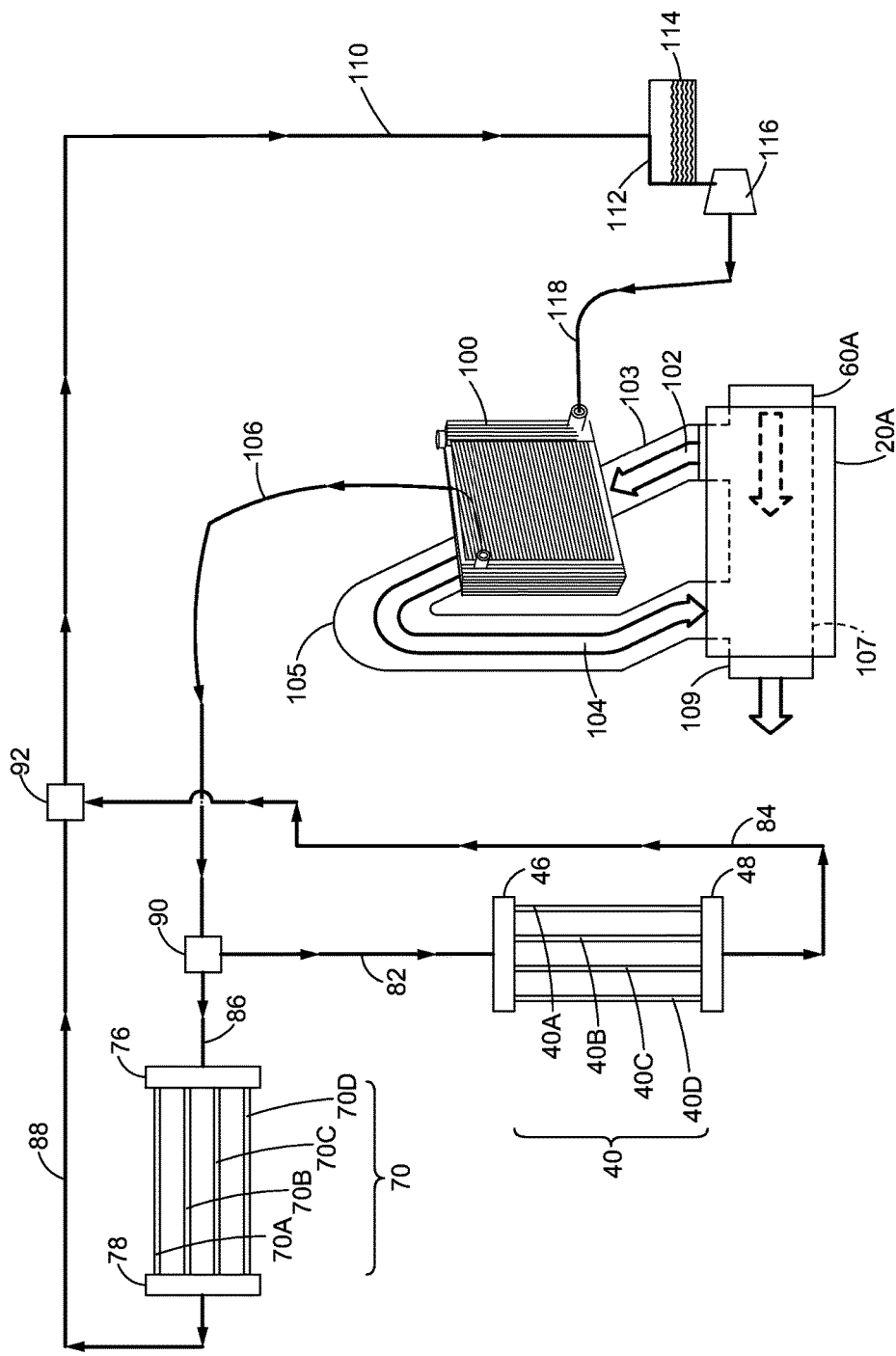
FIG. 4 is a schematic depiction of an aircraft anti-icing system utilizing hot engine core bleed air passing through a second heat exchanger to heat anti-icing liquid supplied to both wing and engine inlet tubes.

FIG. 4 depicts an entire aircraft anti-icing system 28 that includes both wing and engine inlet aspects. Thus, a third heat exchanger 100 (also shown in phantom in FIG. 1) utilized in accordance with this disclosure is an air-to-liquid heat exchanger that uses hot engine core bleed air from the engine inlet 60A (depicted by an arrow 102 flowing through hot air bleed 103) to heat anti-icing fluid 114 contained in a reservoir 112, as shown. Cooled engine bleed air (depicted by an arrow 104 flowing through cold air bleed 105) after passing through the heat exchanger 100 contributes to engine thrust. The cooled bleed flows through a nozzle system 107 and exits an outlet 109 of the engine 60A to provide extra mass flow. As a result, increased enthalpy of the air passing through the jet engine provides greater thrust.

Cooled anti-icing fluid 114 is transferred by a pump 116 through a liquid return line 118 into the heat exchanger 100. Within the heat exchanger 100, the anti-icing fluid 114 is heated by the hot bleed air 102, and then passes through a heated anti-icing liquid supply line 106 into the heated anti-icing liquid supply manifold 90. From the manifold 90, heated anti-icing fluid 114 may flow selectively through wing liquid manifold supply line 82 into the heated liquid manifold supply header 46 for passage through the above-described wing tubes 40. Alternatively and/or simultaneously, anti-icing fluid may flow selectively through a separate engine inlet liquid manifold supply line 86 for passage into the heated liquid manifold supply header 76 for subsequent passage into the above-described engine inlet tubes

70. As such, heated anti-icing fluid 114 may be selectively enabled to travel from the supply manifold 90 into the above-described tubes 40 and 70, to heat the leading edges of the wings 14, 16 and/or the engine inlets 60, respectively, either separately or in combination.

The return flow of cooled anti-icing fluid 114 from the tubes 40 (i.e. 40A, 40B, 40C, 40D) passes through a liquid manifold return header 48, then through a wing liquid manifold return line 84. The return flow of cooled anti-icing fluid 114 from the tubes 70 (i.e. 70A, 70B, 70C, 70D) passes through a liquid manifold return header 78, then through engine liquid manifold return line 88. The cooled anti-icing fluid 114 from both liquid manifold return lines 84 and 88 are received in the anti-icing liquid return manifold 92. From the manifold 92, the anti-icing fluid 114 passes through a liquid return line 110 to be returned to the anti-icing fluid reservoir 112.

In the United States, commercial flight is governed by Federal Aviation Regulations (FAR) which contain requirements for sustained flight within known icing conditions, including amount of heat flux in BTU's per hour per foot required to be supplied to affected wing and engine inlet exterior surfaces. The disclosed anti-icing system 28 may be configured to assure that exterior surfaces 36 of the leading edge 30, 32 of the wings 14, 16, and the engine inlets 60 of the engines 20, are heated sufficiently to assure avoidance of ice formation under sustained air flows within the temperatures and liquid water content ranges set forth in FAR, Appendix C. As such, this disclosure may offer a more efficient mechanism for minimizing risks of ice build-up on the described exterior aircraft surfaces during flight.

A method of making an aircraft anti-icing system may include configuring an air-to-liquid heat exchanger in a leading edge of an aircraft wing, the leading edge having exterior and interior surfaces, and securing a plurality of heated liquid-conveying tubes directly to the interior surface of the leading edge.

The method may further include the step of applying a spring clip against the tubes to retain the tubes in place against the interior surface of the leading edge.

The disclosed anti-icing system 28 may have other variations and alternative constructions neither described nor suggested herein. For example, although described only in terms of use with a commercial jet aircraft, other configurations and/or other components of the anti-icing system 28 may be utilized with and in other types of aircraft, and potentially in other environments. Moreover, although the disclosure presents structures only in the shapes, numbers, and sizes depicted, numerous variations of the disclosed structures may be envisioned for use in constructing alternative embodiments, as may be appreciated by those skilled in the art. For example, although only four tubes, 70A, 70B, 70C, and 70D, are schematically shown within each of six sections 74 of the engine inlet 60A of FIG. 3, many more tubes may likely be used for promoting sufficient heat transfer. Moreover, more than six sections 74 could be utilized, depending on numerous design requirements, etc.

What is claimed is:

1. An aircraft wing anti-icing system comprising:
   a liquid-to-air heat exchanger including a plurality of heated anti-icing liquid-conveying tubes secured directly to an interior surface of a leading edge of a wing; and
   an air-to-liquid heat exchanger located at a fuselage of an associated aircraft, spaced away from wings and engines supported on the aircraft, the air-to-liquid heat exchanger configured to transfer heat of engine core bleed air between at least one of the engines and the air-to-liquid heat exchanger, to the liquid-to air heat exchanger;
   wherein, in the liquid-to-air heat exchanger, heat is transferred from the tubes into the interior surface of the leading edge.

2. The aircraft anti-icing system of claim 1, wherein the tubes are configured to convey a heated polypropylene glycol liquid solution in water of at least 40% polypropylene glycol.

3. The aircraft anti-icing system of claim 1, wherein the tubes are arranged in parallel along the interior surface of the leading edge, each secured to both a supply manifold and a return manifold.

4. The aircraft anti-icing system of claim 1, wherein the tubes are formed of stainless steel.

5. The aircraft anti-icing system of claim 1, wherein each tube has a flat side, and wherein the flat side of each tube is directly secured against the interior surface of the leading edge to optimize heat transfer.

6. The aircraft anti-icing system of claim 5, further comprising a spring clip configured to retain the tubes against the interior surface of the leading edge.

7. The aircraft anti-icing system of claim 1, further comprising a thermal grease between the tubes and the interior surface of the leading edge for enhancing heat transfer.

8. The aircraft anti-icing system of claim 7, further comprising a layer of insulation against the tubes, such that the tubes are retained within a space between the thermal grease and the insulation.

9. An aircraft anti-icing system comprising:
   a wing having a leading edge defining first exterior and interior surfaces;
   an engine coupled to the wing, the engine having an engine inlet defining second exterior and interior surfaces;
   a first liquid-to-air heat exchanger including a plurality of heated liquid-conveying tubes secured directly to the first interior surface, wherein heat is transferred from the tubes into the first interior surface;
   a second liquid-to-air heat exchanger including a plurality of heated liquid-conveying tubes secured directly to the second interior surface, wherein heat is transferred from the tubes into the second interior surface; and
   an air-to-liquid heat exchanger configured to selectively increase operational temperatures of anti-icing liquid conveyed to the first and second liquid-to-air heat exchangers using heat from engine bleed air transferred from the engine to the air-to-liquid heat exchanger;
   wherein the air-to-liquid heat exchanger is located at a fuselage of an associated aircraft, spaced away from wings and engines supported on the aircraft.

10. The aircraft anti-icing system of claim 9, further comprising a pump; and
    an anti-icing fluid reservoir;
    wherein the reservoir receives anti-icing fluid and is coupled to the pump, and wherein the pump moves the anti-icing fluid directly through the air-to-liquid heat exchanger.

11. The aircraft anti-icing system of claim 9, further comprising a cooled liquid return manifold coupled to the first and second liquid-to-air heat exchangers for return of anti-icing fluid from the first and second liquid-to-air heat exchangers to the anti-icing fluid reservoir.

12. The aircraft anti-icing system of claim 9, wherein anti-icing fluid is transferred from the air-to-liquid heat exchanger to the first and second liquid-to-air heat exchangers via the pump.

13. A method of making an aircraft anti-icing system, the method comprising the steps of:
- forming a liquid-to-air heat exchanger including a wing having a leading edge defining exterior and interior surfaces;
- securing a plurality of heated liquid-conveying tubes directly to the interior surface of the leading edge;
- forming an air-to-liquid heat exchanger located at a fuselage of an associated aircraft, spaced away from wings and engines supported on the aircraft; and
- forming a hot air bleed between at least one of the engines and the air-to-liquid heat exchanger to direct engine core bleed air to the air-to-liquid heat exchanger;
- wherein the air-to-liquid heat exchanger is configured to transfer heat to the liquid-to-air heat exchanger.

14. The method of claim 13, further comprising the step of applying a spring clip to retain the tubes in place against the interior surface of the leading edge.

\* \* \* \* \*